US012296506B2

United States Patent
Koiwa et al.

(10) Patent No.: US 12,296,506 B2
(45) Date of Patent: May 13, 2025

(54) RESIN CUTTER, GRANULATOR AND PELLET MANUFACTURING METHOD

(71) Applicant: THE JAPAN STEEL WORKS, LTD., Tokyo (JP)

(72) Inventors: Tetsuya Koiwa, Tokyo (JP); Hiroyuki Kawano, Tokyo (JP); Makoto Ishikawa, Tokyo (JP); Soichiro Matsuda, Tokyo (JP); Mutsushi Harawaki, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 115 days.

(21) Appl. No.: 18/034,168

(22) PCT Filed: May 27, 2021

(86) PCT No.: PCT/JP2021/020295
§ 371 (c)(1),
(2) Date: Apr. 27, 2023

(87) PCT Pub. No.: WO2022/091468
PCT Pub. Date: May 5, 2022

(65) Prior Publication Data
US 2023/0382013 A1 Nov. 30, 2023

(30) Foreign Application Priority Data
Oct. 29, 2020 (JP) ................. 2020-180994

(51) Int. Cl.
*B29B 9/06* (2006.01)
(52) U.S. Cl.
CPC .................. *B29B 9/06* (2013.01)

(58) Field of Classification Search
CPC ....................................................... B29B 9/06
(Continued)

(56) References Cited

U.S. PATENT DOCUMENTS

| 2004/0009254 A1 | 1/2004 | Eloo et al. |
| 2008/0234445 A1* | 9/2008 | Hamano ............ C08G 64/307 |
| | | 528/176 |

(Continued)

FOREIGN PATENT DOCUMENTS

| CN | 109070371 A | 12/2018 |
| EP | 2228187 A1 | 9/2010 |

(Continued)

OTHER PUBLICATIONS

Office Action issued May 7, 2024, in Japanese Patent Application No. 2020-180994.

(Continued)

*Primary Examiner* — Nahida Sultana
(74) *Attorney, Agent, or Firm* — Potomac Law Group, PLLC

(57) ABSTRACT

A technique of controlling a cutter-blade pressing force to be a constant force even in employment of a configuration improving a production efficiency of a pellet is provided. In a resin cutter, a controller configured to control the cutter-blade pressing force is configured to variably control each of a revolution number of a rotation shaft attached to a cutter head, a magnitude of a rotation-shaft forward force Ff and a magnitude of a rotation-shaft backward force Fb so that the cutter-blade pressing force is constant.

11 Claims, 9 Drawing Sheets

(58) Field of Classification Search
USPC .................................. 425/67, 142; 264/142
See application file for complete search history.

(56) References Cited

U.S. PATENT DOCUMENTS

| | | |
|---|---|---|
| 2017/0259484 A1 | 9/2017 | Tabuse et al. |
| 2019/0184590 A1 | 6/2019 | Takahashi et al. |

FOREIGN PATENT DOCUMENTS

| | | |
|---|---|---|
| JP | H06-218727 A | 8/1994 |
| JP | H10-337726 A | 12/1998 |
| JP | 2004-255783 A | 9/2004 |
| JP | 2005-059411 A | 3/2005 |
| JP | 3751014 B2 | 3/2006 |
| JP | 2012-066387 A | 4/2012 |
| JP | 2017-164920 A | 9/2017 |

OTHER PUBLICATIONS

International Search Report from International Patent Application No. PCT/JP2021/020295, Jul. 13, 2021.
Extended European Search Report and European Search Opinion issued Aug. 23, 2024, in European Patent Application No. 21885592.2.

* cited by examiner

RESIN CUTTER, GRANULATOR AND PELLET MANUFACTURING METHOD

TECHNICAL FIELD

The present invention relates to a resin cutter, a granulator and a pellet manufacturing method, and relates to, for example, a technique effectively applied to a technique of cutting a resin by using a plurality of cutter blades while controlling a cutter-blade pressing force that presses the plurality of cutter blades to a die to be constant.

BACKGROUND ART

Japanese Patent No. 3751014 (Patent Document 1) describes a technique of controlling the cutter-blade pressing force to be constant.

RELATED ART DOCUMENT

Patent Document

Patent Document 1: Japanese Patent No. 3751014

SUMMARY OF THE INVENTION

Problems to be Solved by the Invention

For example, the resin cutter manufactures a pellet by using a rotating cutter blade to cut a resin discharged from a nozzle formed in a die. In this case, in order to normally cut the resin to form the pellet in the resin cutter, it is necessary to slide the cutter blade while bring it in contact with the die. Regarding this point, the cutter blade is worn by the sliding, and therefore, too large cutter-blade pressing force that presses the cutter blade to the die increases a wear amount of the cutter blade. On the other hand, a small cutter-blade pressing force separates the cutter blade from the die, and becomes a cause of cutting trouble that is failure to normally cut the resin to form the pellet. Therefore, in order to cause the resin cutter to normally cut the resin to form the pellet, it is necessary to control the cutter-blade pressing force to constantly have a suitable value.

However, from the present inventor's studies, it has been newly found out that increase in the number of nozzles formed in the die and increase in the number of cutter blades for improving the manufacturing efficiency of the pellet make it difficult to control the cutter-blade pressing force to be the constant force. Therefore, even in employment of a configuration capable of improving the manufacturing efficiency of the pellet, it is desirable to control the cutter-blade pressing force to be the constant force.

Other objects and novel characteristics will be apparent from the description of the present specification and the accompanying drawings.

Means for Solving the Problems

In a resin cutter according to an embodiment, a controller for controlling a cutter-blade pressing force is configured to variably control each of a revolution number of a rotation shaft attached to a cutter head, a magnitude of a rotation-shaft forward force and a magnitude of a rotation-shaft backward force so as to achieve the constant cutter-blade pressing force.

A granulator according to an embodiment includes the resin cutter having the above-described configuration.

In a pellet manufacturing method using the resin cutter having the above-described configuration, a resin discharged from a die is cut by a plurality of cutter blades while a revolution number of a rotation shaft is variably controlled by a revolution-number controller, while a magnitude of a rotation-shaft forward force is variably controlled by a rotation-shaft forward force controller, and while a magnitude of a rotation-shaft backward force is variably controlled by a rotation-shaft backward force controller, so as to achieve the constant cutter-blade pressing force.

Effects of the Invention

According to an embodiment, even in employment of a configuration capable of improving a manufacturing efficiency of a pellet, a cutter-blade pressing force can be controlled to be a constant force.

BRIEF DESCRIPTIONS OF THE DRAWINGS

BEST MODE FOR CARRYING OUT THE INVENTION

The same components are denoted by the same reference signs throughout all the drawings for describing the embodiments, and the repetitive description thereof will be omitted. Note that hatching is used even in a plan view so as to make the drawings easy to see.

<Granulator System>

Figure 1:
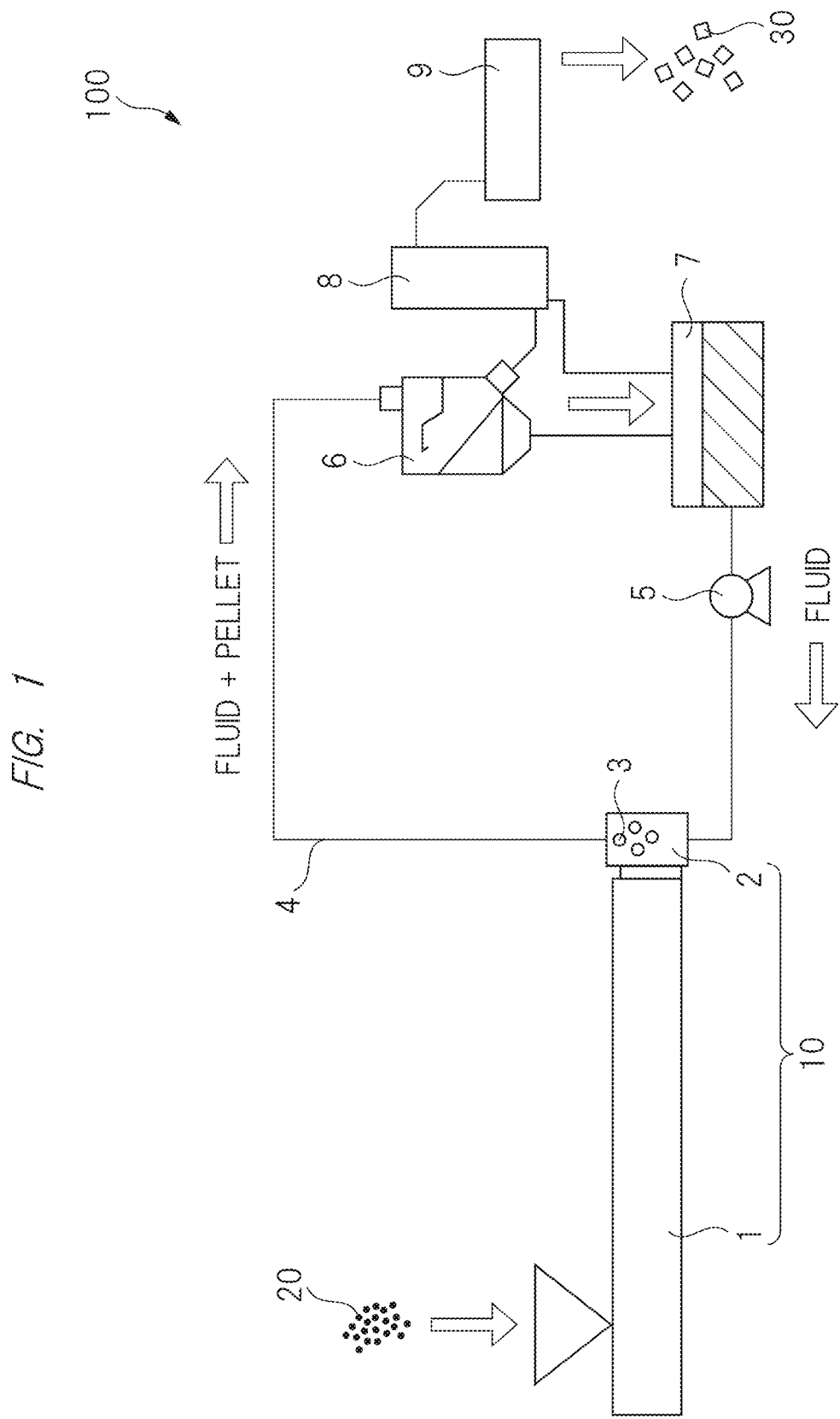
FIG. 1 is a diagram showing a schematic configuration of a granulator system.

FIG. 1 is a diagram showing a schematic configuration of a granulator system.

A granulator system 100 includes: a granulator 10 including an extruder 1 and a resin cutter 2; a pipe 4; a pump 5; a dehydrator 6, a reservoir 7; a centrifugal dehydrating dryer 8 and an oscillating screen 9.

The extruder 1 is configured to knead a resin raw material 20 by using a rotating screw, and to extrude the kneaded resin from a plurality of nozzles formed in a die of the resin cutter 2.

The resin cutter 2 is configured to cut the molten resin extruded from the plurality of nozzles formed in the die by using a plurality of cutter blades to manufacture the pellet.

The pipe 4 functions as a flow passage in which warm water (fluid) flows. The pump 5 has a function of circulating the warm water flowing in the pipe 4. The reservoir 7 is a storage bath for storing the warm water.

The dehydrator 6 has a function of separating the pellet from the warm water, and the centrifugal dehydrating dryer 8 has a function of further drying the pellet. The oscillating screen 9 is configured to classify the pellet by size.

The granulator system 100 configured as described above operates as follows. Specifically, the resin raw material 20 is fed to the extruder 1 first. Then, the resin raw material 20 fed to the extruder 1 is kneaded by the screw, and then, the molten resin is extruded from the plurality of nozzles formed in the die. The extruded resin is cut by the plurality of cutter blades formed in the resin cutter 2. The resin is cut inside a closed chamber in which the warm water is flowing. In this manner, the molten resin is cut to a pellet 30 having a predetermined size, and then, is cooled and solidified by the warm water. As described above, the solidified pellet 30 is manufactured by the granulator 10 including the extruder 1 and the resin cutter 2.

In this case, the warm water is circulated between the reservoir 7 and the closed chamber by the pipe 4 and the pump 5. As a result, slurry 3 that is mixture of the warm water and the pellet 30 generated in the closed chamber is delivered to the dehydrator 6 through the pipe 4. In the dehydrator 6, the warm water and the pellet 30 are separated from each other, and the flow of the warm water is backed to the reservoir 7. Meanwhile, the slurry 3 that is the mixture of a small amount of the warm water and the pellet 30 is delivered to the centrifugal dehydrating dryer 8. In the centrifugal dehydrating dryer 8, the small amount of the warm water adhered on the pellet 30 is separated. Then, the dried pellet 30 separated from the small amount of the warm water by the centrifugal dehydrating dryer 8 is delivered to the oscillating screen 9, and the flow of the small amount of the warm water separated by the centrifugal dehydrating dryer 8 is backed to the reservoir 7. Then, the oscillating screen 9 classifies the pellet 30 by size.

As described above, the pellet 30 can be manufactured by the granulator system 100.

<Basic Configuration of Resin Cutter>

Subsequently, a configuration of the resin cutter 2 that is a component of the granulator system 100 will be explained.

Figure 2:
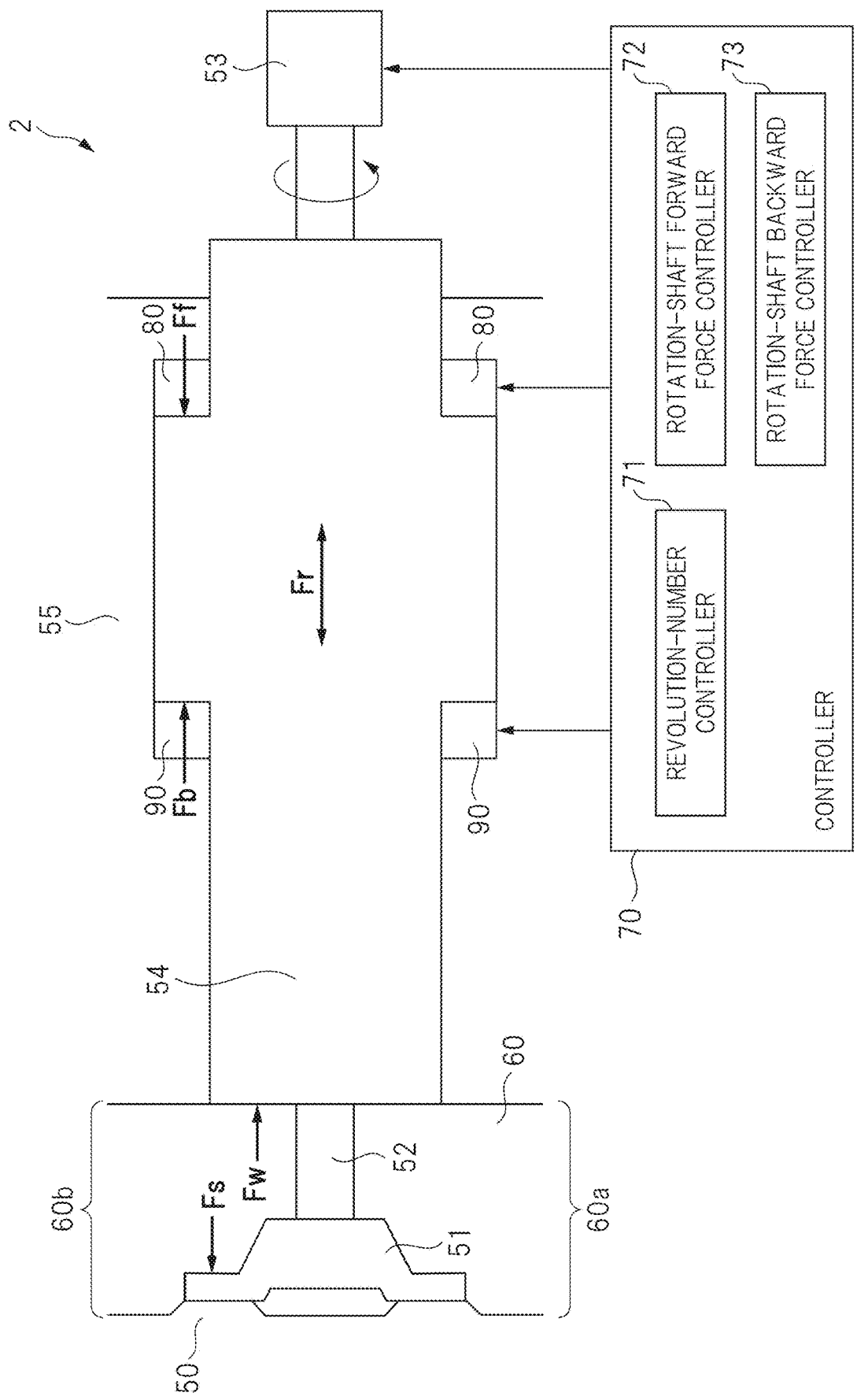
FIG. 2 is a diagram showing a schematic configuration of a resin cutter.

FIG. 2 is a diagram showing a schematic configuration of the resin cutter.

In FIG. 2, the resin cutter 2 includes a die 50, a cutter head 51, a rotation shaft 52, a motor 53, a sleeve 54, a housing 55, a closed chamber 60, an inflow port 60a and an outflow port 60b.

The die 50 is arranged on a resin discharge side of the extruder that kneads and extrudes the resin, and this die 50 is provided with a plurality of nozzles. Each of the plurality of nozzles is configured to discharge the resin extruded from the extruder.

The cutter head 51 is arranged to be pressed onto the die 50, and this cutter head 51 is provided with a plurality of cutter blades. The plurality of cutter blades have a function of cutting the resin discharged from the plurality of nozzles formed in the die 50 to form the pellet.

The rotation shaft 52 is attached to the cutter head 51, and the motor 53 is attached to the rotation shaft 52. As a result, the cutter head 51 is configured to be rotatable because of being attached to the rotation shaft 52 rotated by the motor 53.

The sleeve 54 that is slidable in a shaft direction of the rotation shaft 52 is arranged around the rotation shaft 52, and the housing 55 is arranged outside this sleeve 54. In this case, the rotation shaft 52 is configured to be rotatable relative to the sleeve 54 but not to be movable relative to the sleeve 54 in the shaft direction of the rotation shaft 52. In other words, the rotation shaft 52 and the sleeve 54 are configured to move together in the shaft direction of the rotation shaft 52. This sleeve 54 is configured to be movable relative to the housing 55 in the shaft direction of the rotation shaft 52.

The closed chamber 60 configures a closed space in contact with the cutter head 51. This closed chamber 60 is provided with, for example, the inflow port 60a through which the fluid such as the warm water flows in and an outflow port through which the fluid and the pellet flow out of the closed chamber 60.

<<Configurational Example of Die>>

Figure 3:
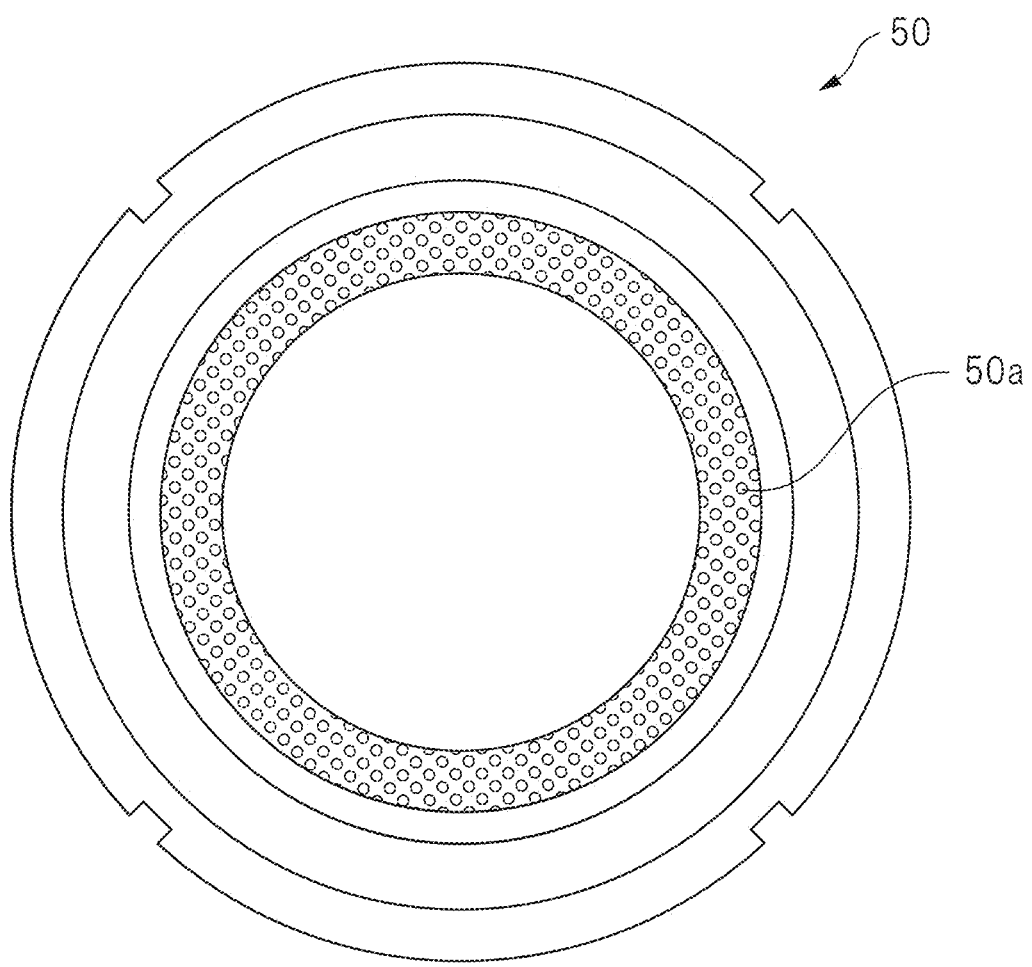
FIG. 3 is a plan view showing a schematic configuration of a die.

FIG. 3 is a plan view showing a schematic configurational example of the die.

In FIG. 3, the die 50 has, for example, a substantially circular shape as a plan shape, and includes a plurality of nozzles 50a. From each of the plurality of nozzles 50a, the molten resin kneaded by the extruder is discharged.

<<Configurational Example of Cutter Head>>

Figure 4:
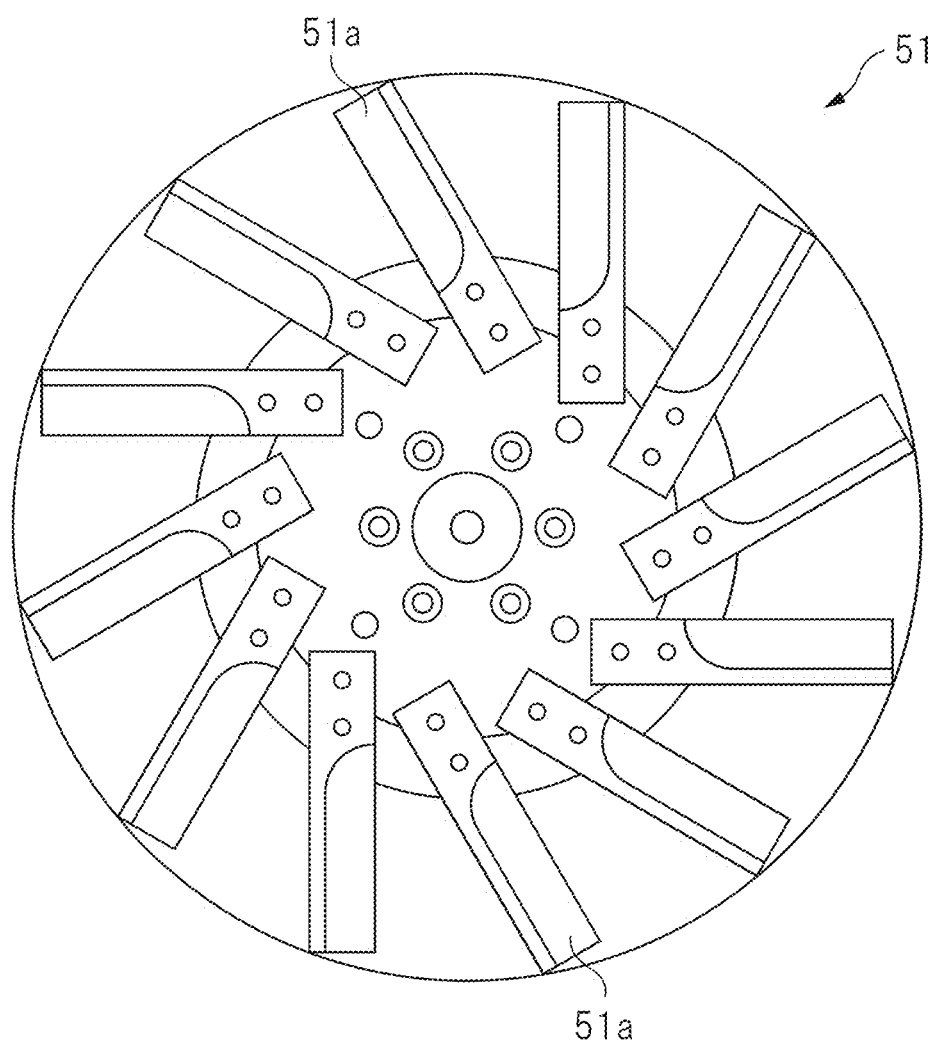
FIG. 4 is a plan view showing a schematic configuration of a cutter head.

FIG. 4 is a plan view showing a schematic configurational example of the cutter head.

In FIG. 4, the cutter head 51 has, for example, a substantially circular shape as a plan shape, and this cutter head 51 is provided with a plurality of cutter blades 51a. Each of the plurality of cutter blades 51a has a substantially rectangular shape as a plan shape.

The cutter head 51 is configured to be rotatable while being pressed onto the die 50. As a result, the resin discharged from the plurality of nozzles 50a formed in the die 50 is cut by the plurality of cutter blades 51a formed in the cutter head 51.

<Basic Operation of Resin Cutter>

The resin cutter 2 is configured as described above, and its operation will be explained below with reference to FIG. 2.

First, the resin kneaded by the extruder is discharged in the molten state from the plurality of nozzles formed in the die 50 to the closed chamber 60. The discharged molten resin is cut by the plurality of cutter blades formed in the cutter head 51 that is attached to the rotation shaft 52 rotated by the motor 53 and that rotates at a high speed. Then, the cut resin is cooled and solidified to form the pellet by the warm water flowing through the inflow port 60a of the closed chamber 60. In this case, since the warm water having flown into the closed chamber 60 flows out through the outflow port 60b of the closed chamber 60, and therefore, the formed pellet is also discharged through the outflow port 60b. The slurry that is the mixture of the discharged warm water and pellet is delivered to, for example, the dehydrator 6 through the pipe 4 as shown in FIG. 1. The subsequent operations are as explained in the operation of the granulator system shown in FIG. 1. In the above-described manner, the resin cutter 2 can manufacture the solidified pellet by cutting the molten resin.

<Necessity for Control for Cutter-Blade Pressing Force>

In this case, the cutter-blade pressing force that presses the plurality of cutter blades formed in the cutter head 51 onto the die 50 is needed to be controlled to a suitable constant value. This is because too large cutter-blade pressing force that presses the cutter blades onto the die increases the wear amount of the cutter blades since the pressing of the cutter blades onto the die 50 wears the cutter blades while a small cutter-blade pressing force separates the cutter blades from the die and becomes a cause of cutting trouble that is failure to normally cut the resin to form the pellet. Therefore, the resin cutter 2 has a configuration for controlling the cutter-blade pressing force to be a constant force. This configuration will be explained below.

<Configuration for Control for Cutter-Blade Pressing Force>

In FIG. 2, the resin cutter 2 includes a controller 70, a rotation-shaft forward force generator 80, and a rotation-shaft backward force generator 90.

The rotation-shaft forward force generator 80 is configured to generate a rotation-shaft forward force "Ff" on the rotation shaft 52. For example, the rotation-shaft forward force generator 80 is configured to generate the rotation-shaft forward force by using a pressure of a pressure medium injected into a first gap. Specifically, a production of the pressure of the pressure medium and a pressure-receiving area of the first gap represents the rotation-shaft forward force "Ff". This rotation-shaft forward force "Ff" is a force bringing the rotation shaft 52 (sleeve 54) to the die 50, and is a force generated by the rotation-shaft forward force generator 80.

The rotation-shaft backward force generator 90 is configured to generate a rotation-shaft backward force "Fb" on the rotation shaft 52. For example, the rotation-shaft backward force generator 90 is configured to generate the rotation-shaft backward force by using a pressure of a pressure medium injected into a second gap. Specifically, a production of the pressure of the pressure medium and a pressure-receiving area of the second gap represents the rotation-shaft backward force "Fb". This rotation-shaft backward force "Fb" is a force separating the rotation shaft 52 (sleeve 54) from the die 50, and is a force generated by the rotation-shaft backward force generator 90.

The controller 70 is configured to control the cutter-blade pressing force that presses the plurality of cutter blades onto the die 50, and includes a revolution-number controller 71, a rotation-shaft forward force controller 72 and a rotation-shaft backward force controller 73.

The revolution-number controller 71 is configured to control a revolution number of the rotation shaft 52. Specifically, this is configured to control the revolution number of the rotation shaft 52 by controlling the rotation of the motor 53 to which the rotation shaft 52 is attached.

The rotation-shaft forward force controller 72 is configured to control the rotation-shaft forward force "Ff" by adjusting the pressure of the pressure medium injected into the first gap.

The rotation-shaft backward force controller 73 is configured to control the rotation-shaft backward force "Fb" by adjusting the pressure of the pressure medium injected into the second gap.

The controller 70 configured as described above is configured to control the cutter-blade pressing force expressed by the following relation formula to be the constant force.

Specifically, the cutter-blade pressing force F is expressed by "F=Ff+Fs−Fb−Fw±Fr" if it is assumed that the cutter-blade pressing force is expressed as "F", that the rotation-shaft forward force is expressed as "Ff", that a cutter-blade driving force that is generated by the rotation of the plurality of cutter blades and that varies in a magnitude depending on the revolution number of the rotation shaft is expressed as "Fs", that the rotation-shaft backward force is expressed as "Fb", that a backward force caused by a fluid pressure of the fluid filling the closed chamber is expressed as "Fw", and that a slide resistance force caused by the forward or backward movement of the rotation shaft is expressed as "Fr".

Figure 5:
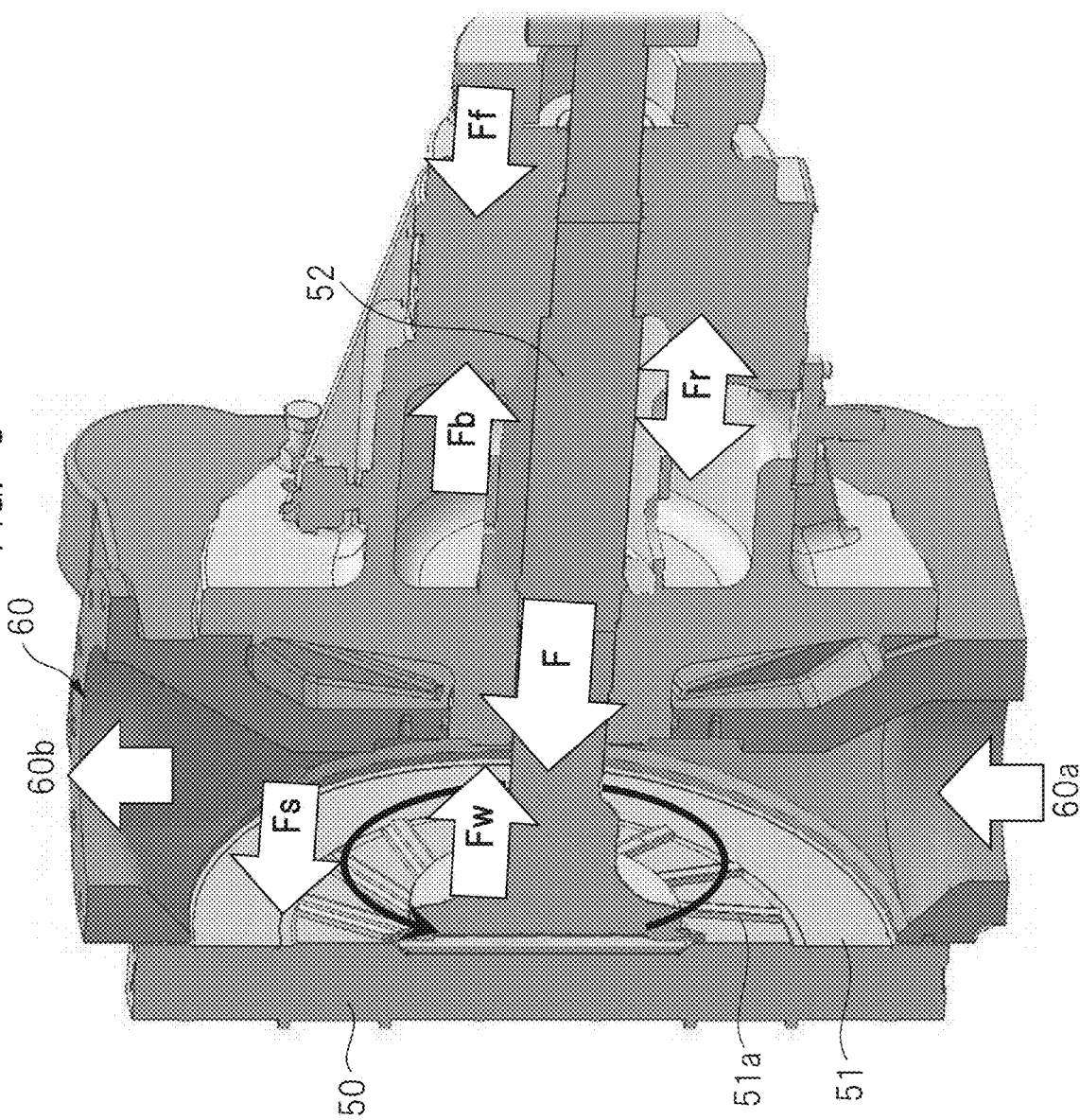
FIG. 5 is a diagram showing a schematic configuration of a principal part of a resin cutter.

For example, FIG. 5 is a diagram showing a schematic configuration of a principal part of the resin cutter. In the case of the rotation-shaft forward force "Ff", the cutter-blade driving force "Fs" and the rotation-shaft backward force "Fb", FIG. 5 shows the slide resistance force "Fr" and the backward force "Fw" caused by the fluid pressure of the fluid filling the closed chamber.

In this case, each of the "Fw" and the "Fr" shows an almost constant value (constant) defined by the structure of the resin cutter 2, and can be previously estimated. Therefore, in order to keep the constant cutter-blade pressing force "F", the controller 70 of the resin cutter 2 controls the value of "Ff+Fs−Fb" to be constant. An operation example of this controller 70 will be explained below.

<Operation Example of Controller 70>

Figure 6:
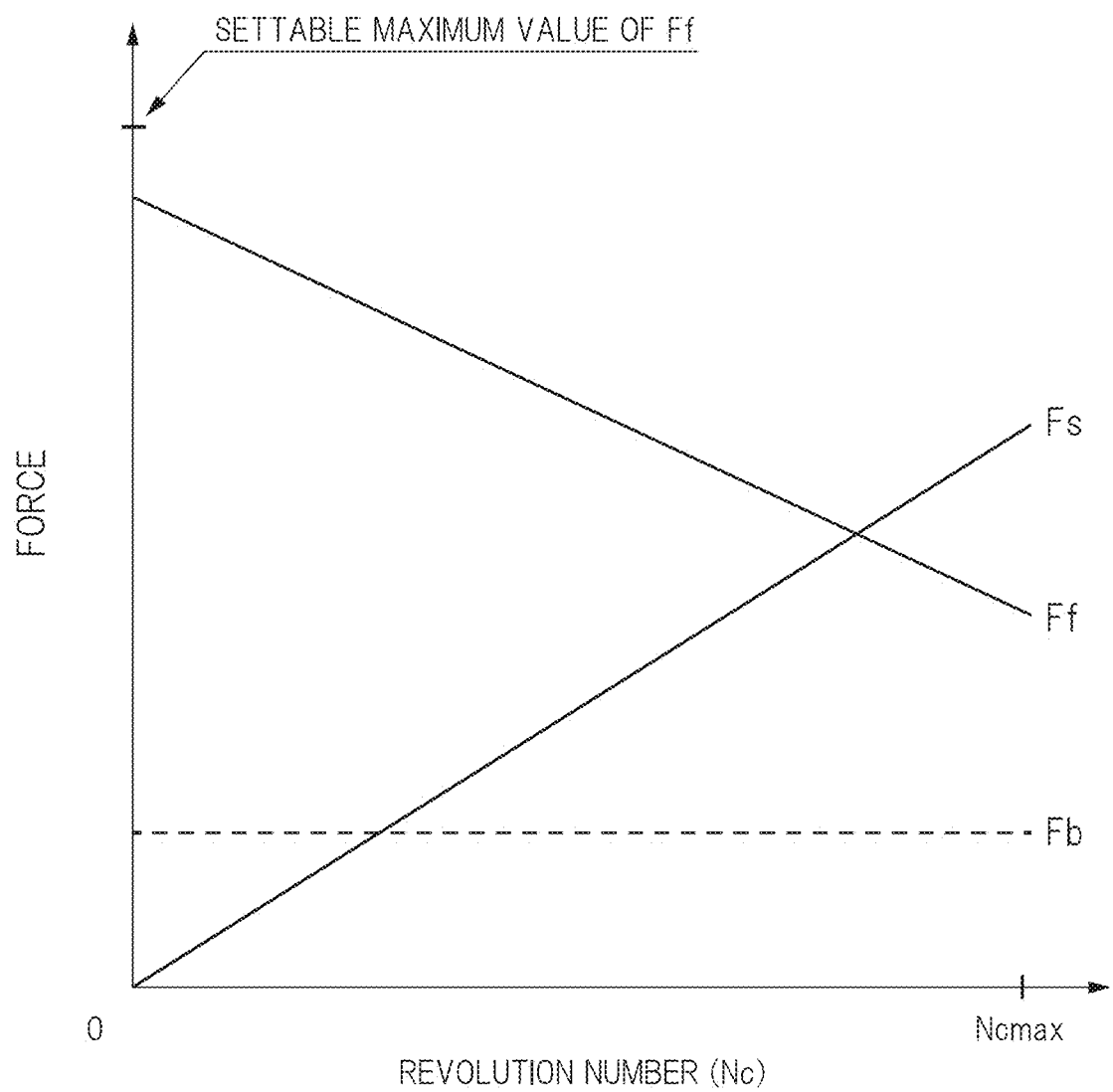
FIG. 6 is a graph for explaining an operation example of a controller.

FIG. 6 is a graph for explaining the operation example of the controller 70.

In FIG. 6, a horizontal axis represents the revolution number (Nc) of the rotation shaft, and a vertical axis represents the force. First, when the motor 53 is operated by the controller 70, the revolution number Nc of the rotation shaft 52 also increases in accordance with increase in the revolution number of the motor. In this case, the revolution number Nc of the rotation shaft 52 is adjusted in accordance with a resin production amount of the granulator 10. In other words, when the resin production amount of the granulator 10 is small, the revolution number Nc of the rotation shaft 52 is small. When the resin production amount of the granulator 10 is large, the revolution number Nc of the rotation shaft 52 is large. In this case, the cutter-blade driving force "Fs" has a property in which the larger the revolution number Nc of the rotation shaft 52 is, the larger the cutter-blade driving force is.

Therefore, in order to keep the constant "Ff+Fs−Fb" even in the change of the revolution number Nc, it is necessary to control the rotation-shaft forward force "Ff" and the rotation-shaft backward force "Fb". Specifically, as shown in FIG. 6, when the revolution number Nc of the rotation shaft 52 is larger, the rotation-shaft forward force controller 72 makes the rotation-shaft forward force "Ff" smaller so as to cancel the increase of the cutter-blade driving force "Fs". And, even in the change of the revolution number Nc of the rotation shaft 52, the rotation-shaft backward force controller 73 controls the rotation-shaft backward force "Fb" to be constant. In this case, a reason why the rotation-shaft backward force controller 73 controls the rotation-shaft backward force "Fb" to be constant even in the change of the revolution number Nc of the rotation shaft 52 is that the stability of the control and the easiness of the adjustment are to be emphasized. In other words, the variable control for the rotation-shaft forward force "Ff" by the rotation-shaft forward force controller 72 and the variable control for the rotation-shaft backward force "Fb" by the rotation-shaft backward force controller 73 make the control complicated. Therefore, if the rotation-shaft forward force "Ff" is made smaller by the rotation-shaft forward force controller 72 so as to cancel the increase of the cutter-blade driving force "Fs", the variable control for the rotation-shaft backward force "Fb" by the rotation-shaft backward force controller 73 is unnecessary, and the stability of the control and the easiness of the adjustment can be achieved.

According to such an operation example of the controller 70 shown in FIG. 6, the constant cutter-blade pressing force "F" can be kept even in the change of the revolution number Nc of the rotation shaft 52.

<New Findings Found Out by Present Inventors>

Next, new findings found out by the present inventors will be explained.

In recent years, the improvement of the manufacturing efficiency of the pellet manufactured by the granulator system 100 has been studied. In this case, a size of the die 50 tends to be large. This is because the number of the nozzles 50a formed in the die 50 can be increased by the increase of the size of the die 50. In other words, this is because the increase of the number of the nozzles 50a formed in the die 50 can increase the number of pellets provided by cutting the resin discharged from the nozzles 50a by the cutter blades 51a. And, the increase of the size of the die 50 also increases a size of the cutter head 51 pressed onto the die 50. As a result, the number of the cutter blades 51a formed in the cutter head 51 is also increased. Therefore, the manufacturing efficiency of the pellet can be improved by synergetic effect of the increase of the number of the nozzles 50a because of the increase of the size of the die 50 and the increase of the number of the cutter blades 51a because of the increase of the size of the cutter head 51.

In this case, the increase of the number of the cutter blades 51a formed in the cutter head 51 increases the cutter-blade driving force "Fs". This is because it is clear that the cutter-blade driving force "Fs" is increased by the increase of the number of the cutter blades 51a since the cutter-blade driving force "Fs" is a force generated by rotation of the cutter blades 51a in the warm water inside the closed chamber 60, the cutter blades 51a being attached to the cutter head 51 to have an attack angle with respect to the rotation direction, as similar to a case of a propeller.

This means that a variation range of the cutter-blade driving force "Fs" in the change of the revolution number Nc of the rotation shaft 52 is large. As a result, the present inventors have newly found out that the control technique of making the rotation-shaft forward force "Ff" small so as to cancel the increase of the cutter-blade driving force "Fs" explained above in the chapter "<Operation Example of Controller 70>" is difficult to keep the constant cutter-blade pressing force "F". In other words, the new findings having been found out by the present inventors are the findings in which it is difficult to keep the constant cutter-blade pressing force "F" only by the decrease of the rotation-shaft forward force "Ff" since the increase of the number of the cutter blades 51a formed in the cutter head 51 for improving the manufacturing efficiency of the pellet manufactured by the granulator system 100 increases the variation range of the cutter-blade driving force "Fs".

Figure 7:
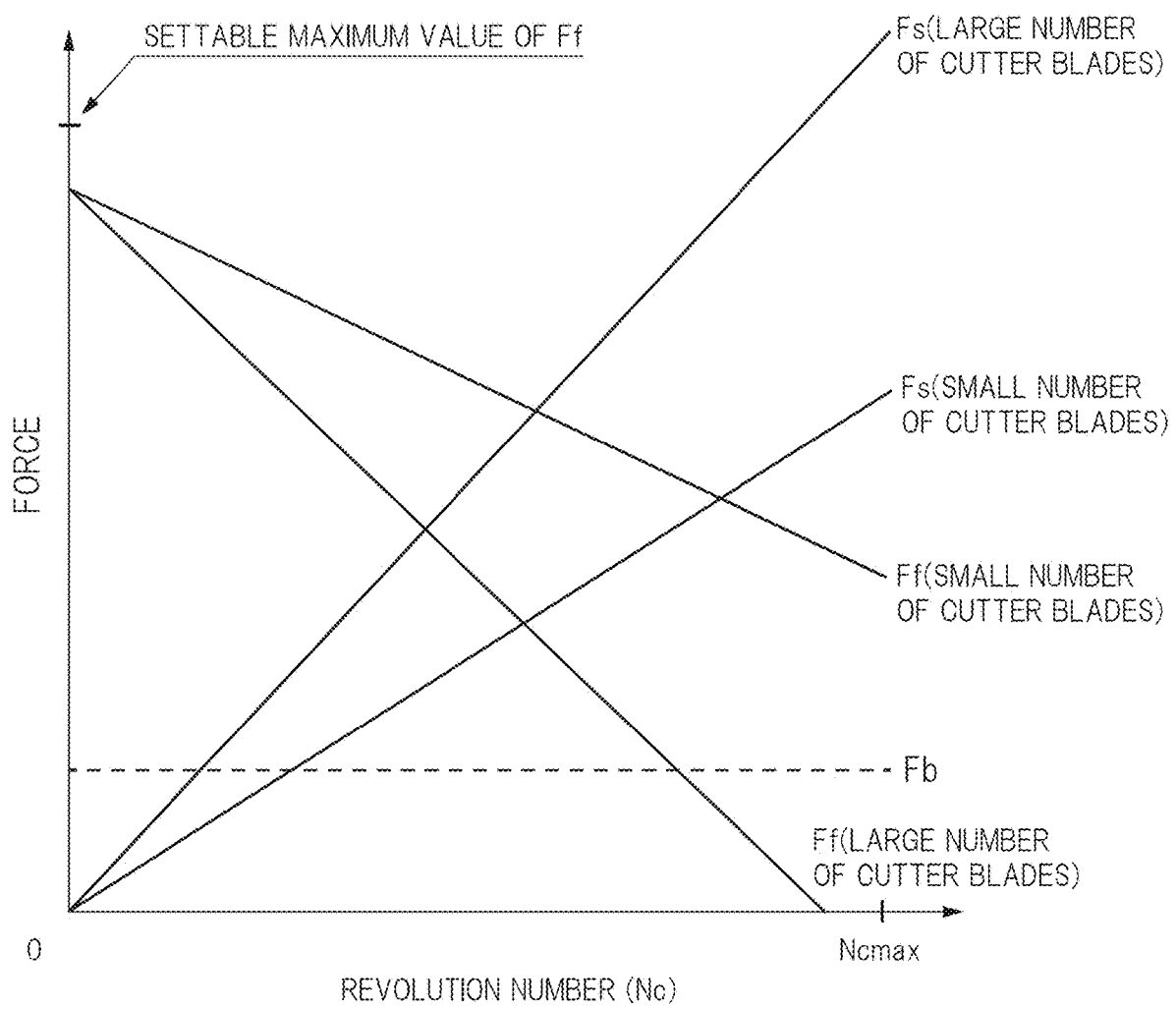
FIG. 7 is a diagram for explaining the fact that it is difficult to keep a constant cutter-blade pressing force by only decrease in a rotation-shaft forward force made by a rotation-shaft forward force controller.

FIG. 7 is a diagram for explaining that it is difficult to keep the constant cutter-blade pressing force "F" only by the decrease of the rotation-shaft forward force "Ff" performed by the rotation-shaft forward force controller 72.

In FIG. 7, the variation range of the cutter-blade driving force "Fs" in the change of the revolution number Nc of the rotation shaft 52 is made larger in the case of the large number of the cutter blades 51a than the case of the small number of the cutter blades 51a. Therefore, in order to keep the constant cutter-blade pressing force "F", it is also necessary to increase the variation range of the rotation-shaft forward force "Ff" in accordance with the variation range of the cutter-blade driving force "Fs" caused by the change of the revolution number Nc of the rotation shaft 52. However, since the rotation-shaft forward force "Ff" has a set limit value based on, for example, the pressure medium specification or the specification typified by the size of the resin cutter 2, the adjustable variation range of the rotation-shaft forward force "Ff" is limited.

Regarding this point, for increasing the variation range of the rotation-shaft forward force "Ff" in order to keep the constant cutter-blade pressing force "F", it is necessary to increase the pressure receiving area of the first gap or increase the pressure made by the pressure medium. However, the pressure made by the pressure medium is defined by the specification of the pressure medium provided by the user, and therefore, it is difficult to increase the pressure made by the pressure medium. Meanwhile, in order to increase the pressure receiving area of the first gap, it is necessary to increase the size of the first gap, and this leads to the increase in the size of the resin cutter 2 and the increase in the manufacturing cost.

By the increase of the number of the cutter blades 51a as described above, the variation range of the cutter-blade driving force "Fs" is made larger than the controllable variation range of the rotation-shaft forward force "Ff". As a result, it is difficult to keep the constant cutter-blade pressing force "F" only by the control for the rotation-shaft forward force "Ff" performed by the rotation-shaft forward force controller 72. In other words, the increase in the number of the cutter blades 51a includes a room for improvement in a point of view of the achievement of the control for keeping the constant cutter-blade pressing force "F".

Accordingly, in the present embodiment, a devisal has been made to the room for improvement. A technical idea with this devisal in the present embodiment will be explained below.

Distinction of Embodiment

A distinction of the present embodiment is the variable control for the rotation-shaft backward force "Fb" in addition to the variable control for the rotation-shaft forward force "Ff" for keeping the constant cutter-blade pressing force "F". In other words, the distinction of the present embodiment is the variable control for the rotation-shaft backward force "Fb" instead of the control for the rotation-shaft backward force "Fb" to have the constant value. In this manner, according to the present embodiment, even if the variation range of the cutter-blade driving force "Fs" is made larger than the controllable variation range of the rotation-shaft forward force "Ff" by the increase of the number of the cutter blades 51a, "Ff+Fs−Fb" can be controlled to be constant even in the change of the revolution number Nc by the control for the rotation-shaft backward force "Fb" to be increased. As a result, according to the present embodiment, the constant cutter-blade pressing force "F" can be kept even in the increase of the number of the cutter blades 51a formed in the cutter head 51, and therefore, the resin can be stably cut to form the pellet. In other words, in the pellet manufacturing method using the resin cutter 2 for manufacturing the pellet, the pellet can be stably manufactured by causing the plurality of cutter blades 51a to cut the resin discharged from the die 50 while causing the revolution-number controller 71 to variably control the revolution number of the rotation shaft 52, causing the rotation-shaft forward force controller 72 to variably control the rotation-shaft forward force "Ff" and causing the rotation-shaft backward force controller 73 to variably control the rotation-shaft backward force "Fb" so as to achieve the constant cutter-blade pressing force "F".

Figure 8:
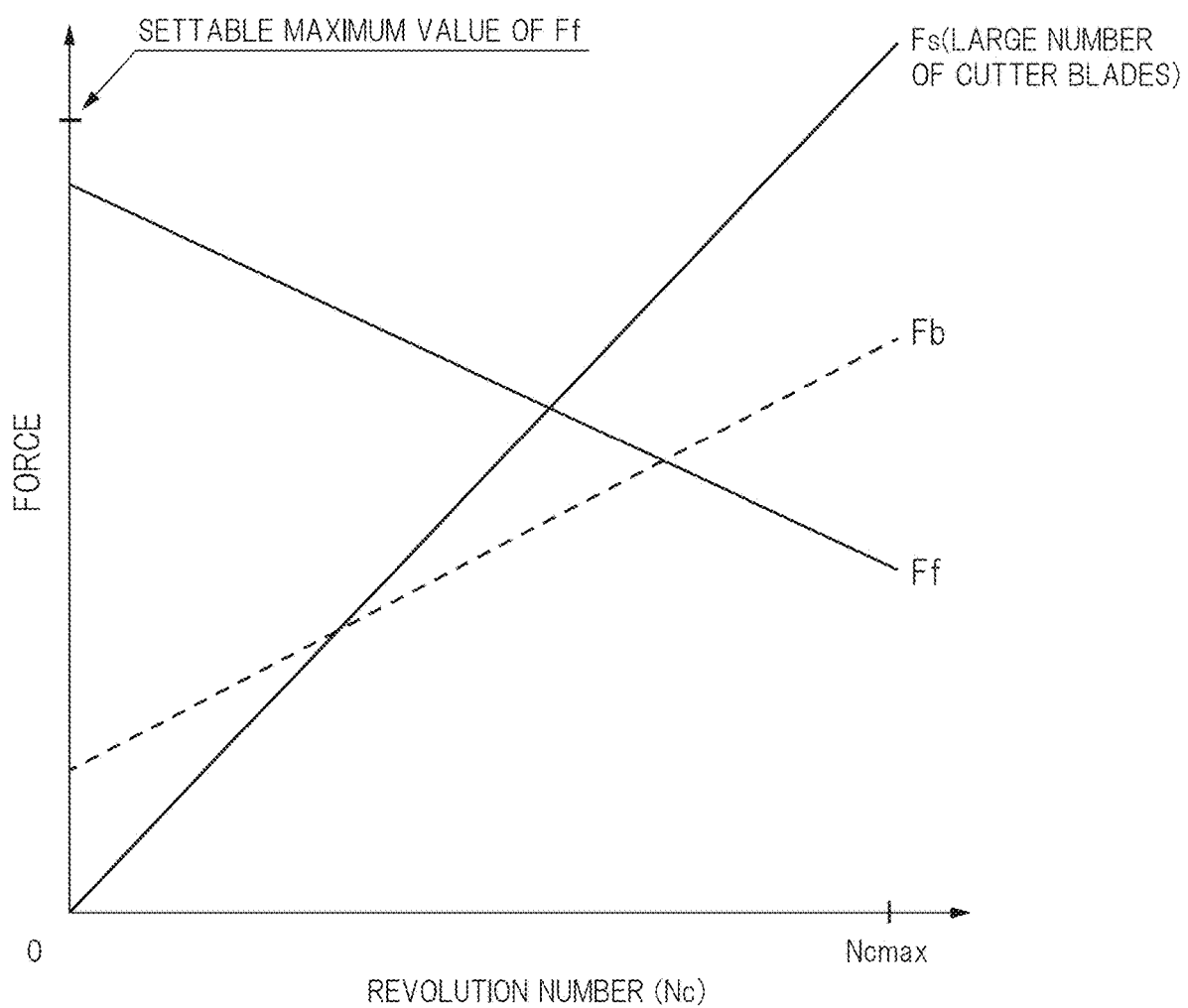
FIG. 8 is a diagram for explaining a feature of the present embodiment that is not only variable control for the rotation-shaft forward force but also variable control for the rotation-shaft backward force.

FIG. 8 is a diagram for explaining the distinction of the present embodiment that is the variable control for the rotation-shaft backward force "Fb" in addition to the variable control for the rotation-shaft forward force "Ff".

In FIG. 8, the increase of the number of the cutter blades 51a increases the variation range of the cutter-blade driving force "Fs" in the change of the revolution number Nc of the rotation shaft 52. Regarding this point, in the present embodiment, the increase of the cutter-blade driving force "Fs" is canceled by the combination of the control for the rotation-shaft forward force "Ff" to be decreased and the control for the rotation-shaft backward force "Fb" to be increased in accordance with the increase of the revolution number of the rotation shaft 52 in order to keep the constant cutter-blade pressing force "F". In this manner, according to the present embodiment, even if the variation range of the cutter-blade driving force "Fs" is larger than the controllable variation range of the rotation-shaft forward force "Ff", the constant cutter-blade pressing force "F" can be kept even in the change of the revolution number Nc by the control for the rotation-shaft backward force "Fb" to be increased.

For example, the rotation-shaft backward force controller 73 is configured to control the rotation-shaft backward force "Fb", based on a linear function represented by "Fb=a×Nc+b". In this function, a term "a" is a constant, a term "Nc" is the revolution number of the rotation shaft 52, and a term "b" is a constant. This case can provide a merit that is easiness of the control for the rotation-shaft backward force "Fb".

However, the control for the rotation-shaft backward force "Fb" performed by the rotation-shaft backward force controller 73 is not limited to this. For example, the rotation-shaft backward force controller 73 may be configured to control the rotation-shaft backward force "Fb", based on a quadratic function represented by "Fb=a×Nc$^2$+b×Nc+c". In this function, a term "a" is a constant, a term "Nc" is the revolution number of the rotation shaft 52, and each of terms "b" and "c" is a constant. This case can provide the following merit. Specifically, the variation of the cutter-blade pressing force "F" caused by the variation of the revolution number of the rotation shaft 52 is generally not linear but non-linear. Therefore, when the rotation-shaft backward force "Fb" is controlled not linearly (based on the linear function) but non-linearly (based on the quadratic function) by the rotation-shaft backward force controller 73, it is easy to control the cutter-blade pressing force "F" to be the constant force.

Effects of Embodiment

For example, the following effects can be provided by the technical idea of the present embodiment.

(1) Even if the variation range of the cutter-blade driving force "Fs" is made larger than the controllable variation range of the rotation-shaft forward force "Ff" by the increase of the number of the cutter blades 51a, the cutter-blade pressing force "F" can be controlled to be the constant force even in the change of the revolution number Nc by the control for the rotation-shaft backward force "Fb" to be increased.

(2) Since the cutter-blade pressing force "F" can be controlled to be the constant force by the variable control for the rotation-shaft backward force "Fb" without the change of the variable range of the rotation-shaft forward force "Ff" even in the increase of the number of the cutter blades 51a, this manner can provide a merit that is unnecessity of the change of the configuration of the rotation-shaft forward force generator 80.

(3) The unnecessity of the change of the configuration of the rotation-shaft forward force generator 80 means that it is unnecessary to increase the size of the resin cutter 2 for the increase of the pressure receiving area of the first gap. As a result, according to the present embodiment, the increase of the manufacturing cost of the resin cutter 2 can be suppressed.

(4) Since it is unnecessary to change a control program for controlling the rotation-shaft forward force "Ff", time and effort for developing a new control program for controlling the rotation-shaft forward force "Ff" can be reduced.

(5) Since the rotation-shaft backward force "Fb" can be smoothly controlled by the rotation-shaft backward force controller 73 in accordance with, for example, the above-described linear function or quadratic function, the revolution number of the rotation shaft 52 can be smoothly increased without rapid change in the increase of the revolution number of the rotation shaft 52 performed by the operation of the resin cutter 2.

(6) The control for the rotation-shaft backward force "Fb" performed by the rotation-shaft backward force controller 73 is based on, for example, the above-described linear function or quadratic function, and is not the complicated control. Therefore, a merit that is easiness of the adjustment can be provided since the control line represented by the linear function or quadratic function can be set by the check of only several operation conditions.

<Quantitative Requirement>

Lastly, the increase of the number of the cutter blades 51a will be specifically defined. Specifically, this explanation will describe how much increase of the number of the cutter blades 51a leads to the superiority of the employment of the distinction of the present embodiment that is the variable control for the rotation-shaft backward force "Fb" in addition to the variable control for the rotation-shaft forward force "Ff".

The larger the number of the cutter blades 51a formed in the cutter head 51 is, the larger the generated cutter-blade driving force "Fs" is. In this case, a distance between the cutter blades 51a adjacent to each other is smaller.

In this case, the blade width ratio is defined as "(Distance between Adjacent cutter blades of the Plurality of cutter blades)/(Each Blade width of the Plurality of cutter blades)". In this case, the larger the number of the cutter blades 51a formed in the cutter head 51 is, the smaller the blade width ratio is. In other words, the smaller the blade width ratio is, the larger the number of the cutter blades 51a formed in the cutter head 51 is.

Figure 9:
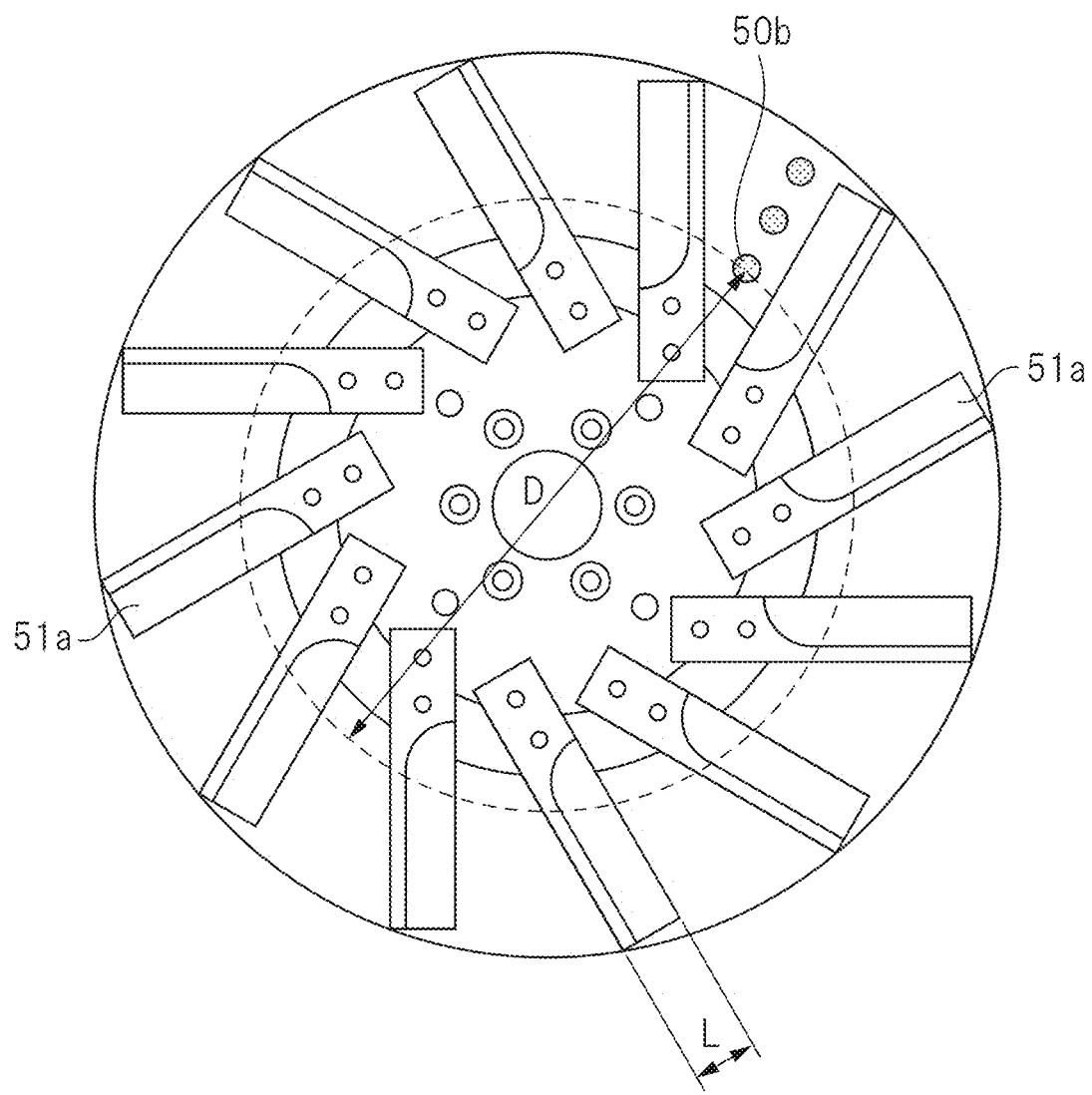
FIG. 9 is a diagram showing a parameter used for calculation of a blade width ratio.

For example, as shown in FIG. 9, this blade width ratio is calculated from "(Circular constant)×(Diameter D of Circle penetrating Nozzle 50b on Innermost circumference of Die of Plurality of nozzles formed in Die)/(Number of plurality of cutter blades 51a×Each blade width L of plurality of cutter blades 51a)". According to the present inventor's studies, the distinction of the present embodiment is effectively applied when, for example, a relation of "Blade width ratio≤4" is satisfied.

In the foregoing, the invention made by the inventors of the present application has been concretely described on the basis of the embodiments. However, it is needless to say that the present invention is not limited to the foregoing embodiments, and various modifications and alterations can be made within the scope of the present invention.

EXPLANATION OF REFERENCE CHARACTERS 1 extruder
2 resin cutter
3 slurry 4 pipe
5 pump
6 dehydrator
7 reservoir
8 centrifugal dehydrating dryer
9 oscillating screen
10 granulator
20 resin raw material
30 pellet
50 die
50a nozzle
51 cutter head
51a cutter blade
52 rotation shaft
53 motor
54 sleeve
55 housing
60 closed chamber
60a inflow port
60b outflow port
70 controller
71 revolution-number controller
72 rotation-shaft forward force controller
73 rotation-shaft backward force controller
D diameter
Fb rotation-shaft backward force
Ff rotation-shaft forward force
Fs cutter-blade driving force
L blade width
Nc revolution number
100 granulator system

The invention claimed is:

1. A resin cutter comprising:
a die formed on a resin discharge side of an extruder kneading and extruding a resin;
a plurality of nozzles provided in the die;
a plurality of cutter blades cutting the resin to form a pellet, the resin being discharged from the plurality of nozzles;
a cutter head including the plurality of cutter blades arranged therein;
a rotation shaft attached to the cutter head;
a motor rotating the rotation shaft;
a closed chamber configuring a closed gap in contact with the cutter head;
an inflow port through which fluid flows into the closed chamber;
an outflow port through which the fluid and the pellet flow out of the closed chamber;
a controller configured to control a cutter-blade pressing force for pressing the plurality of cutter blades onto the die;
a rotation-shaft forward force generator generating a rotation-shaft forward force on the rotation shaft; and
a rotation-shaft backward force generator generating a rotation-shaft backward force on the rotation shaft,
wherein the controller includes:
a revolution-number controller configured to control a revolution number of the rotation shaft;
a rotation-shaft forward force controller configured to control a magnitude of the rotation-shaft forward force; and
a rotation-shaft backward force controller configured to control a magnitude of the rotation-shaft backward force, and
the controller is configured to variably control each of the revolution number of the rotation shaft, the magnitude of the rotation-shaft forward force and the magnitude of the rotation-shaft backward force so that the cutter-blade pressing force is constant.

2. The resin cutter according to claim 1,
wherein when the rotation-shaft backward force is Fb, the rotation-shaft backward force controller is configured to control the rotation-shaft backward force, based on a linear function represented by $Fb = a \times Nc + b$ in assumption in which:
a: a constant,
Nc: the revolution number of the rotation shaft, and
b: a constant.

3. The resin cutter according to claim 1,
wherein when the rotation-shaft backward force is Fb, the rotation-shaft backward force controller is configured to control the rotation-shaft backward force, based on a quadratic function represented by $Fb = a \times Nc^2 + b \times Nc + c$ in assumption in which:
a: a constant,
Nc: the revolution number of the rotation shaft,
b: a constant, and
c: a constant.

4. The resin cutter according to claim 1,
wherein, if a blade width ratio is defined as Blade width ratio=(Distance between Adjacent cutter blades of the Plurality of cutter blades)/(Blade width of each of the Plurality of cutter blades), a relation of the Blade width ratio≤4 is satisfied.

5. The resin cutter according to claim 4,
wherein the blade width ratio is calculated from (Circular constant)×(Diameter of Circle penetrating Nozzle on Innermost circumference of the Die among the Plurality of nozzles formed in the Die)/(Number of the plurality of cutter blades×blade width of each of the plurality of cutter blades).

6. A granulator comprising:
an extruder kneading and extruding a resin; and
a resin cutter cutting the resin extruded from the extruder to form a pellet,
wherein the resin cutter includes:
a die formed on a resin discharge side of the extruder;
a plurality of nozzles provided in the die;
a plurality of cutter blades cutting the resin to from a pellet, the resin being discharged from the plurality of nozzles;
a cutter head including the plurality of cutter blades arranged therein;
a rotation shaft attached to the cutter head;
a motor rotating the rotation shaft;
a closed chamber configuring a closed gap in contact with the cutter head;
an inflow port through which fluid flows into the closed chamber;
an outflow port through which the fluid and the pellet flow out of the closed chamber;
a controller configured to control a cutter-blade pressing force for pressing the plurality of cutter blades onto the die;
a rotation-shaft forward force generator generating a rotation-shaft forward force on the rotation shaft; and
a rotation-shaft backward force generator generating a rotation-shaft backward force on the rotation shaft,
wherein the controller includes:
a revolution-number controller configured to control a revolution number of the rotation shaft;

a rotation-shaft forward force controller configured to control a magnitude of the rotation-shaft forward force; and
a rotation-shaft backward force controller configured to control a magnitude of the rotation-shaft backward force, and
the controller is configured to variably control each of the revolution number of the rotation shaft, the magnitude of the rotation-shaft forward force and the magnitude of the rotation-shaft backward force so that the cutter-blade pressing force is constant.

7. The granulator according to claim 6,
wherein when the rotation-shaft backward force is Fb, the rotation-shaft backward force controller is configured to control the rotation-shaft backward force, based on a linear function represented by $Fb=a \times Nc+b$ in assumption in which:
a: a constant,
Nc: the revolution number of the rotation shaft, and
b: a constant.

8. The granulator according to claim 6,
wherein when the rotation-shaft backward force is Fb, the rotation-shaft backward force controller is configured to control the rotation-shaft backward force, based on a quadratic function represented by $Fb=a \times Nc^2+b \times Nc+c$ in assumption in which:
a: a constant,
Nc: the revolution number of the rotation shaft,
b: a constant, and
c: a constant.

9. The granulator according to claim 6,
wherein, if a blade width ratio is defined as Blade width ratio=(Distance between Adjacent cutter blades of the Plurality of cutter blades)/(Blade width of each of the Plurality of cutter blades), a relation of the Blade width ratio≤4 is satisfied.

10. The granulator according to claim 9,
wherein the blade width ratio is calculated from (Circular constant)×(Diameter of Circle penetrating Nozzle on Innermost circumference of the Die among the Plurality of nozzles formed in the Die)/(Number of the plurality of cutter blades×blade width of each of the plurality of cutter blades).

11. A pellet manufacturing method of manufacturing a pellet using a resin cutter,
the resin cutter including:
a die formed on a resin discharge side of an extruder kneading and extruding a resin;
a plurality of nozzles provided in the die;
a plurality of cutter blades cutting the resin to form the pellet, the resin being discharged from the plurality of nozzles;
a cutter head including the plurality of cutter blades arranged therein;
a rotation shaft attached to the cutter head;
a motor rotating the rotation shaft;
a closed chamber configuring a closed gap in contact with the cutter head;
an inflow port through which fluid flows into the closed chamber;
an outflow port through which the fluid and the pellet flow out of the closed chamber;
a controller configured to control a cutter-blade pressing force for pressing the plurality of cutter blades onto the die;
a rotation-shaft forward force generator generating a rotation-shaft forward force on the rotation shaft; and
a rotation-shaft backward force generator generating a rotation-shaft backward force on the rotation shaft,
the controller including:
a revolution-number controller configured to control a revolution number of the rotation shaft;
a rotation-shaft forward force controller configured to control a magnitude of the rotation-shaft forward force; and
a rotation-shaft backward force controller configured to control a magnitude of the rotation-shaft backward force, and
the pellet manufacturing method comprising a step of:
cutting the resin discharged from the die, by using the plurality of cutter blades, while causing the revolution-number controller to variably control the revolution number of the rotation shaft, causing the rotation-shaft forward force controller to variably control a magnitude of the rotation-shaft forward force and causing the rotation-shaft backward force controller to variably control a magnitude of the rotation-shaft backward force so that the cutter-blade pressing force is constant.

* * * * *